March 5, 1968  N. W. KLOOTWYK  3,371,617
PUMP HAVING COMBINATION CHECK VALVE AND SHUTOFF VALVE
Filed Aug. 9, 1965  2 Sheets-Sheet 1
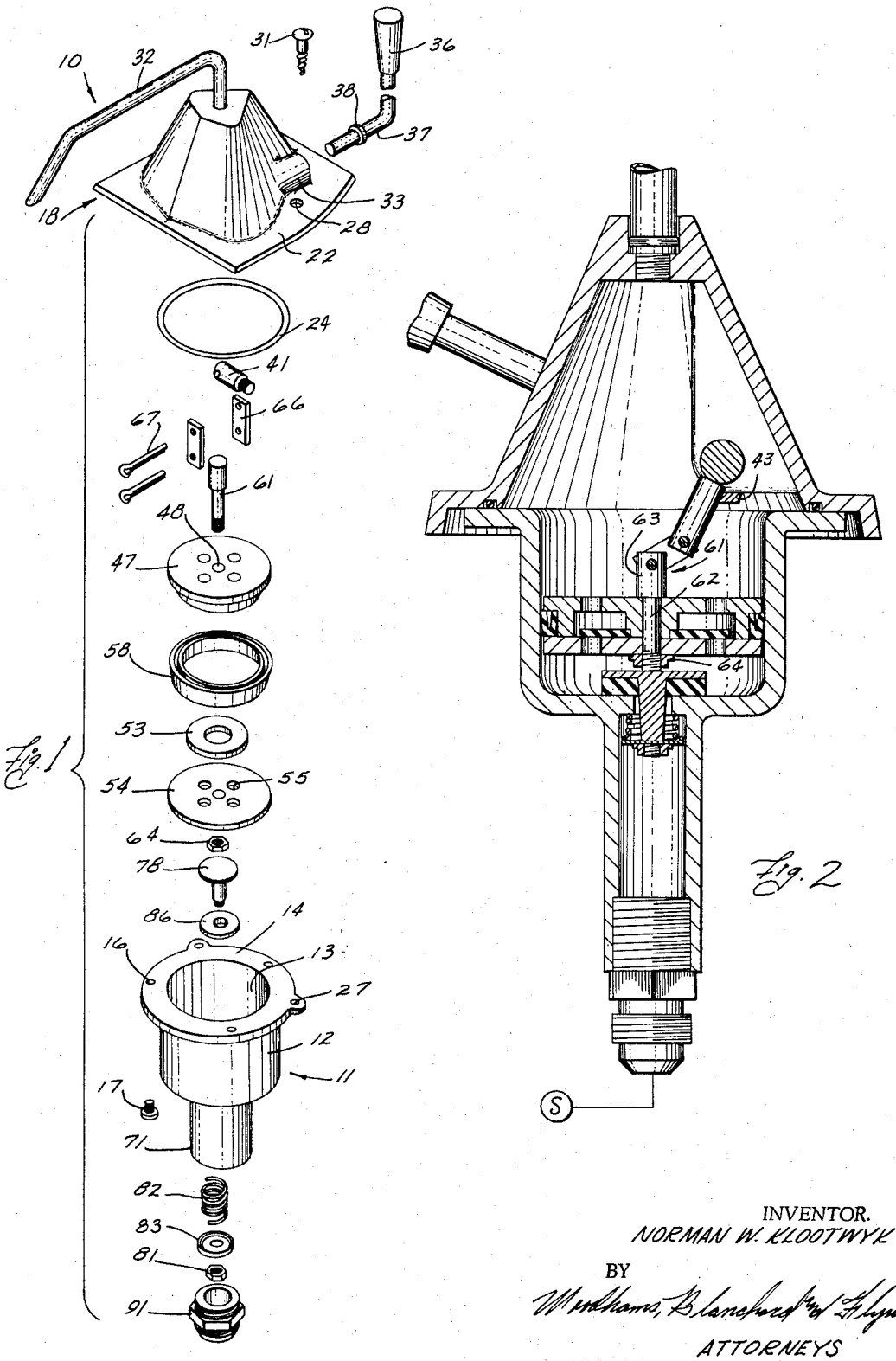
INVENTOR.
NORMAN W. KLOOTWYK
BY
ATTORNEYS

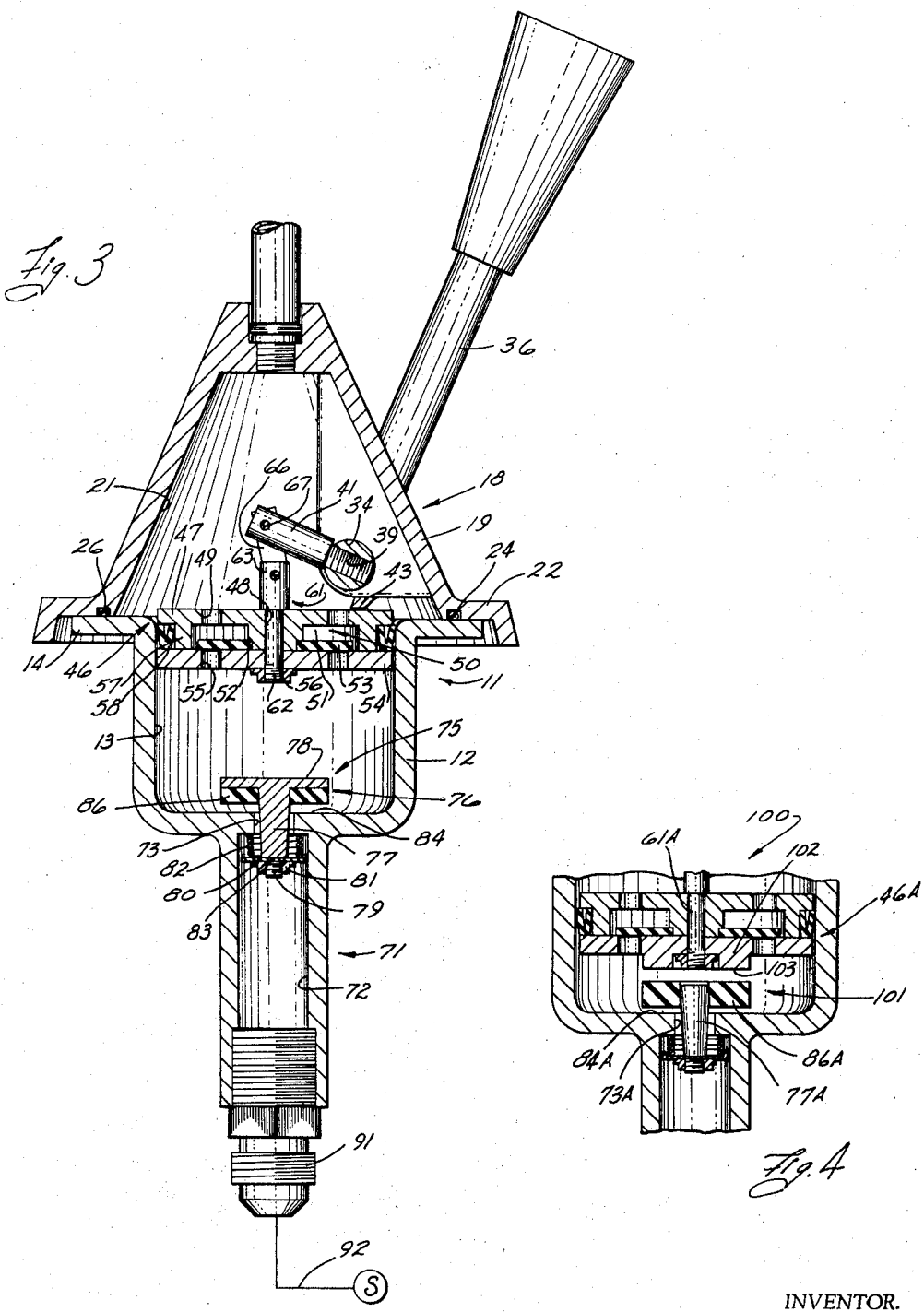

United States Patent Office 3,371,617
Patented Mar. 5, 1968

3,371,617
PUMP HAVING COMBINATION CHECK
VALVE AND SHUTOFF VALVE
Norman W. Klootwyk, Marshall, Mich., assignor to S. H.
Leggitt Company, Marshall, Mich., a corporation of
Michigan
Filed Aug. 9, 1965, Ser. No. 478,374
7 Claims. (Cl. 103—178)

This invention relates to a galley pump and more particularly relates to a manually actuable galley pump of simplified construction capable of controlling the flow of a pressurized liquid therethrough and, alternatively of pumping liquid from a supply.

The pump embodying the present invention is the result of continued development work on flow controlling galley pumps of the general type and, more specifically, of an attempt to provide a simplified flow controlling galley pump disclosed in copending application Ser. No. 455,250, assigned to the assignee of the present invention.

Galley pumps are widely used on boats, travel trailers or the like. In such situations, the pump is normally located adjacent a basin for pumping water thereinto from a water storage tank at ambient pressure located therebelow in response to manual reciprocation of the pump handle.

The galley pump of the aforementioned application is capable of such service and, further, is alternatively connectible to a pressurized water source, such as a city water hydrant, the pump handle now being actuable to regulate and turn off or on a flow of water from the pressurized source through the pump. While the pump of the aforementioned application has been found very satisfactory in use, it does require three separate valves to perform all of its functions.

Hence, the objects of this invention include:

(1) To provide a galley pump of simplified construction which is capable of pumping water from a storage tank and, alternatively, is capable of controlling a flow of water therethrough from a source under greater than ambient pressure.

(2) To provide a galley pump, as aforesaid, which is automatically and immediately capable of acting as either a pump or flow control valve as required by the pressure characteristic of the water supply connected thereto without any change, modification or adjustment thereof.

(3) To provide a galley pump as aforesaid, which is simplified in construction, which has a reduced number of valves, which requires only a pair of valves to function effectively in both its modes of operation and in which the number of valves do not exceed the number found in conventional elementary reciprocating piston pumps.

(4) To provide a galley pump, as aforesaid, which includes a check valve located between the pump inlet and the moveable pumping wall of the pump for preventing escape of liquid in the pump back through the inlet thereof, in which the check valve includes a portion engageable by the moveable wall and in which the moveable wall may be energized to close the check valve even when the pump inlet is connected to a relatively high pressure source.

(5) To provide a galley pump, as aforesaid, which includes means actuable for holding the moveable wall in a locked position against the check valve without attention from the operator and with sufficient force to prevent leakage of said check valve, in which the holding means is readily releasable to allow unidirectional flow through the check valve and which indicates to the operator when the check valve is locked in a closed condition by the holding means.

(6) To provide a galley pump, as aforesaid, in which means are provided to firmly back the moveable seating portion of the check valve at least when the wall is disposed to maintain the check valve closed in order to positively prevent deformation of the moveable sealing portion and, hence, to positively prevent leakage through the check valve.

(7) To provide a galley pump, as aforesaid, which is capable of inexpensive and reliable construction, which is generally no more complex than commonly available simple reciprocating piston or diaphragm pumps and which is capable of manufacture at a price competitive with such conventional pumps.

(8) To provide a galley pump, as aforesaid, which can be made at least comparable to conventional galley pumps in ease of operation, pumping efficiency, operating life and ease of maintenance and installation.

Other objects and purposes of this invention will be apparent to persons acquainted with apparatus of this general type upon reading the following specification and inspecting the accompanying drawings.

In the drawings:

FIGURE 1 is an exploded oblique view of a galley pump construction embodying the invention.

FIGURE 2 is an enlarged, fragmentary central cross-sectional view of the galley pump of FIGURE 1 in a closed condition.

FIGURE 3 is a view substantially similar to FIGURE 2 but showing the galley pump in an open condition.

FIGURE 4 is a fragmentary central cross-sectional view of a modified galley pump.

Certain terminology will be used in the following description for convenience in reference only and will not be limiting. The words "upwardly," "downwardly," "rightwardly" and "leftwardly" will designate directions in the drawings to which reference is made. In addition, the words "upwardly" and "downwardly" will indicate directions corresponding to the normal position of use of the galley pump embodying the invention. The words "inwardly" and "outwardly" will refer to directions toward and away from, respectively, the geometric center of the device and designated parts thereof. Said terminology will include the words above specifically mentioned, derivatives thereof and words of similar import.

General description

In general, the objects and purposes of this invention are met by providing a combined pump and flow control valve construction comprising a cylinder having inlet and outlet openings and a wall reciprocable within the cylinder for pumping liquid from the inlet to the outlet. Manually operable actuating means are provided for reciprocating the wall. The cylinder carries a valve seat between the inlet and movable wall. A flow control valve is provided in the cylinder and is engageable with the seat. The wall is actuable to urge the flow control valve against the seat so that flow through the pump is positively prevented. At least one of the movable wall and flow control valve has a rigid portion overlying the seat to prevent leakage of the valve in the presence of a relatively high liquid pressure at the inlet.

Detailed description

The galley pump 10 (FIGURES 1 and 2) embodying the invention includes portions substantially similar to the galley pump of the afore-mentioned application Ser. No. 455,250 except as hereinafter specifically noted. For convenience in reference, however, the pump as a whole will be described hereinbelow. The galley pump 10 embodying the present invention includes a stepped cylindrical housing 11 (FIGURES 1, 2 and 3). The housing 11 may be of any convenient material and in the particular embodiment shown was molded of plastic, more specifically, Delrin. The upper portion 12 of the housing 11 is recessed to define a coaxial and upwardly opening cylinder 13 therewithin. An outwardly extending radial flange 14 at the upper end of the housing 11 includes a plurality of holes 16 capable of receiving machine screws 17 for securing a housing cover 18 atop said flange 14.

The cover 18 has an upstanding and substantially frusto-conical body 19 defining a downwardly opening recess 21 which normally communicates with the upper end of the cylinder 13. A flange 22, integral with the bottom of the body 19, extends radially beyond the flange 14 of the housing 11. A large resilient O-ring 24 is seated in an annular groove 26 in the bottom face of the flange 22 and bears continuously on the upper face of the flange 14 to seal the upper end of the cylinder 13. Aligned holes 27 and 28 through the flanges 14 and 22, respectively, allow the pump 10 to be fixed to a suitable counter top, not shown, by screws one of which is indicated at 31.

A spout 32 is affixed, preferably pivotally, to the upper end of the cover 18 for communication with the recess 21. The cover 18 is preferably made of a corrosion resistant metal.

A boss 33 extends from the body 19 along the top of the flange 22. A horizontal opening 34 (FIGURE 3) extends through the boss 33 and into the recess 21 along an axis displaced rightwardly as seen in FIGURE 3 from the central axis of the cylinder 13. A manually actuable handle 36 (FIGURE 1) has a preferably integral spindle 37 at right angles to the lower end thereof. The spindle 37 is snugly but slideably receivable in the opening 34 for pivotally mounting the handle 36 on the cover 18. An O-ring 38 on the spindle 37 seals the outer end of the opening 34. The spindle 37 has a threaded diametral opening 39 therethrough between the O-ring 38 and the end thereof. A lever arm 41 threadedly engages the opening 39 at one end thereof and is thus pivotally supported within the recess 21.

An abutment 43 (FIGURE 2) is provided within the cover 18 for abutting the lever arm 41 when said lever arm is in the position shown in FIGURE 2 to prevent further counterclockwise rotation of the spindle 37 beyond the position shown.

A moveable wall, shown for purposes of illustration as a piston 46, is snugly and reciprocably disposed within the cylinder 13. The piston 46 includes a cylindrical body member 47 having a central opening 48 therethrough. The body member 47 has an annular recess 51 in the bottom face thereof. A plurality, here four, of preferably evenly circumferentially spaced water openings 49 pass downwardly through the body member 47 just within the perimeter of the annular recess 51. The lower end of the inner circumferential wall of the annular recess 51 is preferably radially inwardly stepped to form the annular downwardly facing step 52 for receiving the inner circumference of a resilient valve washer 53.

The piston 46 further includes a circular retainer disk 54 below the body part 47 having a central opening 56 normally disposed coaxially with the central opening 48 of the body part 47. The retainer disk 54 presses the inner edge portion of the washer 53 firmly and upwardly against the step 52. A plurality, here four, of preferably evenly circumferentially spaced water openings 55 through the disk 54 are coverable by the radially outer portion of the washer 53. The disk 54, the washer 53 and the body member 47 coact to define a lift valve generally indicated at 50 for allowing upward water flow therethrough but preventing downward return of water therethrough.

The lower perimeter of the body part 47 is radially reduced and with the adjacent outer portion of the disk 54 defines an annular groove 57 therebetween. A conventional seal ring 58 is disposed in the groove 57 for snugly but slideably contacting the wall of the cylinder 13 at least for preventing downward liquid flow therepast. The body member 47 and disk 54 are preferably plastic, for example Delrin, while the washer 53 and ring 58 are preferably rubber.

The lower portion 62 of a rod 61 extends through the central openings 56 and 48. The upper portion 63 of the rod 61 is larger in diameter than the lower portion 62 thereof and abuts the upper face of the piston 46. The lower end of the rod 61 extends downwardly past the lower face of the piston 46 and is preferably threaded for receiving a nut 64. Thus, the body member 47 and the disk 54, with the washer 53 and sea ring 58 sandwiched therebetween, are held firmly together between the nut 64 and the enlarged upper end 63 of the rod 61.

The upper end 63 of the rod 61 and the free end of the lever arm 41 are spaced and pivotally connected through a parallel pair of link plates 66 held thereto by cotter pins 67. Thus, the rod 61 acts through the link plates 66 to maintain the spindle 37 properly axially positioned in the cover 18 and acts with the lever arm 41 and handle 36 to reciprocate the piston 46 in the cylinder 13.

The pump 10 here differs from the pump of the aforementioned application Ser. No. 455,250 in that the link plates 66 are elongated sufficiently as to allow the rod 41 to be rotated in a counterclockwise direction, as seen in FIGURES 2 and 3, about the axis of the spindle 37 past the upper end of the rod 61. The abutment 43 on the cover 18 limits the counterclockwise swing of the central axis of the lever arm 41 after it has passed the center of the pin 67 in the upper end of the rod 61 as seen in FIGURE 2. As a result of this over center swing, the lever arm 41, when in its position of FIGURE 2, is urged further counterclockwise by any upward force on the piston 46. Since the abutment 43 prevents such further counterclockwise movement, upward motion of the piston 46 is positively prevented. Moreover, the maximum amount by which the lever arm 41 can swing past the pin 67 in the upper end of the rod 61 is relatively small. As a result, differences in the vertical position of the piston 46 due to movement of the lever arm 41 between the abutment 43 and the upper end of the rod 61 will be negligible. Thus, an over center lock is provided for maintaining the piston in its downward-most position merely by rotating the handle 36 to its full counterclockwise limiting position and then releasing the handle.

The housing 11 preferably includes a cylindrical extension 71 of reduced diameter which depends from and is preferably integral with the upper portion 12. The extension 71 includes a passage 72 coaxial with the cylinder 13. The passage 72 communicates with the cylinder 13 through a reduced diameter opening 73.

A flow control valve (FIGURES 1, 2 and 3) generally indicated at 75 includes a moveable valve member 76. The valve member 76 preferably comprises an axially elongated valve stem 77 loosely disposed in and extending vertically through the opening 73. A substantially rigid, radially extending valve head 78 is preferably integral with the upper end of the stem 77 and extends radially outwardly beyond the circumference of the opening 73. The valve member 76 is of substantially rigid material such as brass. The valve stem 77, in the particular embodiment shown, has a relatively small downward taper. The lower end 79 of the stem 77 lies within the passage 72 and is of reduced diameter for defining a downwardly facing annular shoulder 80. Such lower end 79 is preferably threaded for receiving a nut 81. A preferably cylindrical helical compression spring 82 loosely surrounds the valve stem 77. The upper end of the spring 82 bears against the bottom end wall of the cylinder 13. A radially extended and upwardly opening cup-shaped spring retainer 83 is held on the lower end of the valve stem 77 by the nut 81 and is urged upwardly against the shoulder 80 for retaining the lower end of the spring 82. The spring 82 thus urges the head 78 of the valve member 76 downwardly toward the upwardly facing seat portion 84 of the bottom of the cylinder 13 immediately surrounding the opening 73. An annular resilient sealing element 86, which may be of rubber or the like, is disposed between the head 78 and the seat surface 84 and, in the particular embodiment shown, is affixed to the bottom surface of the head 78 by any convenient means not shown. Thus, the spring 82 tends to urge the resilient sealing element 86 against the seat surface 84 to prevent reverse flow of liquid from cylinder 13 downwardly through the opening 73 and in this manner functions as an inlet check valve for the pump 10. A pressure in the passageway 72 somewhat greater than the pressure within the cylinder 13 will overcome the force of the spring 82 and urge the valve member 76 upwardly to open the valve 75.

When the piston 46 is in its downwardmost position, the lower end of the rod 61 contacts the upper surface of the head 78 of the valve 75 to strongly urge same firmly against the seat 94 to maintain the valve 75 closed. Moreover, the above-described over center locking action of the lever arm 41, links 66 and rod 61 prevents upward motion of the piston 46 so that the valve 75 is maintained firmly closed when the handle 36 is in its counterclockwisemost position, even when the pressure in the passage 72 far exceeds that in the cylinder 13 and is substantially in excess of the pressure otherwise normally required to open the valve 75.

The lower end of the extension 71 is preferably internally threaded for receiving a suitable fitting 91. The lower end of the fitting 91 is adapted by any convenient means for connection by a line 92 to a source S of liquid, for example, water. The source S may be a suitable reservoir containing water at ambient pressure located beneath the pump 10 in which case the pump 10, when energized, acts as a simple reciprocating lift pump to draw water from the reservoir. On the other hand, the source S may be a pressurized source of liquid, for example, water, such as a city water supply, external electric pump or the like in which case the pump 10 may be used as a flow control valve for controlling the flow of water from the source S therethrough by appropriate actuation of the handle 36.

*Operation*

When the source S contains water at ambient pressure and is located below the pump, oscillation of the handle 36 causes the pump 10 to pump water from the source S and expel same from the spout 32. More specifically, with the piston 46 and parts associated therewith in their uppermost position shown in FIGURE 3, pumping is initiated by a counterclockwise movement of the handle 36 which moves the piston 46 downwardly in the cylinder 13. The spring 82, under such circumstances, maintains the flow control valve 75 closed and the downwardly moving piston tends to increase the pressure of fluid trapped therebelow in the cylinder 13. As a result, the lift valve 50 in the piston 46 opens, allowing the trapped fluid to pass through the piston 46. Movement of the handle 36 may be continued to its counterclockwise limit or reversed before reaching same as desired. Reversal of the movement of the handle 36 causes the piston 46 to rise thereby lowering the pressure beneath the piston to a value below the pressure in the passage 72. As a result, the valve 75 opens and water from the source S is drawn into the chamber 13. Continued oscillation of the pump handle results in a further flow of water upwardly through the pump and outwardly through the spout 32.

On the other hand, the lower end of the pump 10 may be connected to a source S of liquid, for example, water, which supplies water thereto at greater than ambient pressure. The handle 36 of the pump 10 is positionable to shut off and to allow and regulate the flow of such water through the pump and out the spout 32. More specifically, when the handle 36 is in its clockwisemost position of FIGURE 3, the piston is well spaced above the valve 75. Thus, the valve 75 is free to open when the water pressure in the passage 72 is sufficient to overcome the spring 82 in order to allow the water in the passage 72 to enter the cylinder 13. The valves 50 and 75 preferably have similar, relatively low opening pressures.

Thus, the pressure of the water passing through the valve 75 normally will be of sufficient pressure to open the lift valve 50 in the piston. As a result, water will flow past the piston 46 and out of the pump through the spout 32 for as long as the water pressure at the pump inlet remains sufficiently high.

To reduce the flow of water through the pump 10, the handle 36 may be removed in a counterclockwise direction toward its closed position of FIGURE 2 for causing the rod 61 to engage the head 78 of the valve 75 for moving the sealing element 86 downwardly to a position nearer the seat 84.

The flow of water through the pump may be completely shut off by moving the handle 36 toward its counterclockwise limit of FIGURE 2. In the process, the piston 46 is driven by the links 66 and lever arm 41 to its lowermost position whereat the arm 41 is axially aligned with the pivot 67 in the upper end of the rod 61. In this position, the bottom end of the rod 61 is pressed firmly downwardly against the head of the valve 75 with sufficient force to close valve 75 and prevent liquid flow therethrough. The valve 75 may be locked closed by continuing the counterclockwise movement of the handle 36 to its limit of FIGURE 2. In such a position, the axis of the lever arm 41 has swung past the upper pivot point 67 on the rod 61 but the pivot 67 on the arm 41 still remains above the pivot 67 on the rod 61. Thus, the links 66 cause any tendency of the piston 46 to move upwardly to urge the lever arm 41 more tightly against the abutment 43 which prevents further counterclockwise movement thereof and, as a result, the piston is prevented from further upward movement. The locking mechanism comprising the links 66, lever arm 41 and rod 61 is arranged in such a way that the position of the piston changes insignificantly between the fully locked position shown in FIGURE 2 and the position at which the axis of the lever arm 41 is aligned with the upper pivot 67 of the rod 61. The sealing element 86 is sufficiently resilient as to expand sufficiently as to follow any rise of the piston 46 as it assumes its locked position of FIGURE 2 while still remaining tightly pressed against the seat 84 so as to prevent liquid flow therepast. The swing of the lever arm 41 past its position of alignment with the pivot 67 in the upper end of the rod 61 is maintained small to prevent the upward force on the valve 75 and, hence, piston 46 from locking the lever arm 41 against the abutment 43 sufficiently tightly as to prevent or substantially inhibit manual clockwise movement of the handle 36.

*Modification*

FIGURE 4 discloses a modification which lies at least within the broader aspects of the invention and includes a flow control valve 101 which differs from the valve 75 of the above-described FIGURES 1–3. Corresponding parts of the pump of FIGURE 4 will be designated by same reference numerals as corresponding parts of FIGURE 3 with the suffix A added thereto. The flow control valve 101 differs from the valve 75 above described in that the rigid head 78 is eliminated. Instead, the valve 101 includes a resilient sealing element 86A which is secured by any convenient means, not shown, to the upper end of the valve stem 77A. The piston 46A is substantially similar to the piston 46 of the pump 10 except that the bottom surface of the piston 46A is provided with a flat and preferably annular surface 101, which in the particular embodiment shown is provided by a downward extension 102 of the bottom piston wall. The surface 103 is arranged to abut the resilient element 86A and press same firmly against the seat 84A before the lower end of the rod 61A nears the upper end of the valve stem 77A. The surface 103 extends radially outwardly and preferably inwardly beyond the edge of the opening 73A throughout the circumferential extent thereof to provide a rigid backing for the resilient sealing element 86A. Thus, said sealing element will be pressed firmly against the seat 84A when the piston is in its downwardmost or locked positions.

Although particular preferred embodiments of the invention have been disclosed above for illustrative purposes, it will be understood that variations or modifications thereof which lie within the scope of the appended claims are fully contemplated.

The embodiments of the invention in which an exclusive property or privilege is claimed are defined as follows:

1. In a combined pump and flow control valve construction, the combination comprising:
   a cylinder having inlet and outlet openings and a wall reciprocable within said cylinder for pumping liquid in a direction from said inlet to said outlet;
   actuating means for reciprocating said wall, said actuating means including an arm pivotably mounted relative to said cylinder for angular oscillation relative thereto;
   a valve seat associated with said cylinder;
   a movable flow control valve member engageable with said seat, said wall being actuatable to a terminal position to engage and urge said movable valve member against said seat so that flow through the pump is prevented when the wall is in said terminal position; and
   nonresilient lock means engageable with said arm for positively mechanically locking said wall in said terminal position in which it bears firmly against said movable valve member positively to maintain said valve closed despite relative high fluid pressure in said inlet.

2. The device defined in claim 1 wherein said movable valve member is resilient and further including a rigid element disposed between said movable valve member and said wall for assuring continuous engagement of said valve member and said seat in response to terminal movement of said wall toward said valve seat.

3. The device defined in claim 2 in which said rigid element is affixed to said wall.

4. The device defined in claim 1 in which the arm of said actuating means comprises handle means pivotally mounted relative to said cylinder and link means interconnecting said wall and said handle means, oscillatory movement of said handle means causing said wall to reciprocate;
   said link means further comprising a portion of said lock means and further including stop means adapted to contact said link means when said wall is in said terminal position.

5. The device defined in claim 1 wherein said lock means includes stop means fixed relative to said cylinder, said stop means being adapted to be abuttingly contacted by said actuating means when said wall is in said terminal position for preventing movement of said valve member and said actuating means due to the presence of a relatively high fluid pressure in said inlet against said valve member.

6. The device defined in claim 1 in which said seat is annular, and in which said flow control valve comprises an elongated rod insertable through said seat, a rigid, radially extended head located in said cylinder and fixed to said rod, a resilient ring disposed between said head and said seat and in which said piston includes means engageable with said head for positively closing said valve against a relatively high pressure in the inlet.

7. In a combined pump and flow control valve construction, the combination comprising:
   a cylinder having inlet and outlet openings and a wall reciprocal within said cylinder for pumping liquid in a direction from said inlet to said outlet;
   actuating means for reciprocating said wall;
   a valve seat associated with said cylinder;
   a movable flow control valve member engageable with said seat, said wall being actuatable to a terminal position to engage and urge said movable valve member against said seat so that flow through the pump is prevented;
   said actuating means comprises handle means pivotally mounted relative to said cylinder and link means interconnecting said wall and said handle means, oscillatory movement of said handle causing said wall to reciprocate;
   said link means comprising a lever arm fixedly mounted to said handle means for pivotal movement therewith, and a link member pivotally connected on opposite ends thereof to said lever arm and said wall, respectively;
   said lever arm and link member being generally angularly inclined with respect to each other during reciprocal movement of said wall, said lever arm and link member becoming substantially aligned with respect to each other as said wall approaches the terminal position nearest said valve seat wherein said valve is closed, movement of said wall to said terminal position causing said lever arm and link member to pass through said aligned position such that said lever arm and link member are slightly inclined relative to each other in said terminal position; and
   lock means for locking said wall in said terminal position, wherein said wall bears firmly against said movble valve member, said lock means including stop means for limiting movement of said link means in said terminal position, said stop means locking said link means in position for effectively locking said movable valve member in a position whereby it bears firmly against said valve seat to maintain said valve closed despite relatively high fluid pressure in said inlet.

References Cited
UNITED STATES PATENTS

| | | | |
|---|---|---|---|
| 624,550 | 5/1899 | Schneider | 103—178 |
| 656,306 | 8/1900 | True | 222—375 |
| 825,868 | 7/1906 | Safford | 103—178 X |
| 1,263,299 | 4/1918 | Weinhoener | 230—190 |
| 1,595,027 | 8/1926 | Sielaff | 103—178 |
| 2,309,339 | 1/1943 | Calaway | 230—190 |
| 2,353,069 | 7/1944 | Perkins | 103—178 |
| 2,547,431 | 4/1951 | Anderson | 103—178 X |
| 2,808,786 | 10/1957 | Johnston | 103—178 |
| 2,880,939 | 4/1959 | Esmay | 103—225 |

FOREIGN PATENTS

| | | |
|---|---|---|
| 220,385 | 8/1924 | Great Britain. |
| 778,701 | 5/1957 | Great Britain. |

DONLEY J. STOCKING, *Primary Examiner.*

W. L. FREEH, *Assistant Examiner.*